United States Patent

Watkins et al.

[11] Patent Number: 5,829,503
[45] Date of Patent: Nov. 3, 1998

[54] MOTORCYCLE TIRE

[75] Inventors: David Robert Watkins, Streetly; Nigel Gerard Nock, Walmley; Michael Jackson, Yardley, all of England

[73] Assignee: Sumitomo Rubber Industries Limited, Hyogo, Japan

[21] Appl. No.: 749,012

[22] Filed: Nov. 14, 1996

[30] Foreign Application Priority Data

Nov. 14, 1995 [GB] United Kingdom .................... 9523297

[51] Int. Cl.⁶ .............................. B60C 1/00; B60C 9/30; B60C 123/00
[52] U.S. Cl. ................................ 152/209 R; 152/209 A; 152/212; 152/526
[58] Field of Search ........................... 152/209 R, 209 A, 152/209 D, 526, 212; 156/127, 128.1, 128.6, 129, 130

[56] References Cited

U.S. PATENT DOCUMENTS

| | | | |
|---|---|---|---|
| 1,264,567 | 4/1918 | Smith | 152/212 |
| 1,948,311 | 2/1934 | Orr | 152/212 |
| 3,149,658 | 9/1964 | Wolfe | 156/127 |
| 3,607,497 | 9/1971 | Chrobak | 156/130 |
| 4,848,429 | 7/1989 | Mezzanotte | 152/209 A |

FOREIGN PATENT DOCUMENTS

| | | | |
|---|---|---|---|
| 593288 | 4/1994 | European Pat. Off. | 152/209 R |
| 0 686515 | 12/1995 | European Pat. Off. | |
| 2 184469 | 12/1995 | France. | |
| 1 019924 | 11/1957 | Germany. | |
| 3 525394 | 1/1986 | Germany. | |
| 60-94804 | 5/1985 | Japan | 152/209 R |
| 2-162104 | 6/1990 | Japan | 152/209 A |
| 3-125604 | 5/1991 | Japan | 152/209 R |
| 4-133802 | 5/1992 | Japan | 152/209 R |
| 4-185507 | 7/1992 | Japan | 152/209 R |
| 0 200179 | 5/1986 | United Kingdom. | |

OTHER PUBLICATIONS

Abstract for DE 3525394.

*Primary Examiner*—Steven D. Maki

[57] ABSTRACT

A motorcycle tire having in its normally inflated condition a camber value C/L of between 0.5 and 0.7 and having a maximum axial width between edges of a ground contacting tread wherein in axial cross-section the tread comprises two tread rubber components of different rubber compounds joined by a scarf joint, the scarf joint having a width less than the width of the tread and having an intertread ply comprising reinforcing cords interposed between the two tread rubber components.

9 Claims, 1 Drawing Sheet

MOTORCYCLE TIRE

This invention relates to a pneumatic tire for a motorcycle and in particular but not exclusively to a high performance tire for a race motorcycle.

BACKGROUND OF THE INVENTION

Such tires have very wide treads which in transverse cross-section are sharply curved to provide good contact with the road surface when the motorcycle is steeply banked in cornering.

The treads of such motorcycle tires are required to be both resistant to wear and damage such that the tires do not disintegrate under the typically high temperatures and severe conditions of racing but also to have high levels of grip to allow cornering at very high speed. Since these twin requirements demand largely conflicting properties of rubber, the compositions of these tread rubbers are a compromise giving a best balance of properties.

The configuration of a motorcycle race circuit is a unique combination of curves, corners and straights. Thus, on many race circuits, the motorcycle is subject to continual changes in direction requiring banking the motorcycle from left to right punctuated by short periods of upright running. Accordingly, on these race circuits, the tires run substantially evenly on all parts of the tread during each lap of the circuit. Under these conditions, the entire tread reaches a substantially uniform temperature and, thus, exhibits consistent road contacting characteristics over the whole tread area enabling the rider to race with control and confidence.

However, certain race tracks have configurations which are not conducive to the development of uniform characteristics over the whole of the tire tread. Such tracks, for example, may comprise a succession of long bends and curves in the same direction covering a substantial proportion of the circuit with just a few sharp bends in the opposite direction constituting the remaining minor portion of the circuit. Thus on such circuits the tires are subjected to relatively long periods of running on one shoulder, which accordingly reaches a very high temperature, only to be suddenly banked over on to the opposite shoulder which in comparison is much cooler and, therefore, has substantially different road contacting characteristics which are manifest as reduced grip.

The problem for the motorcycle rider on such difficult circuits is aggravated by the necessity for the tire tread rubber to be optimized for wear and damage resistance at the expense of grip in order for the tires to survive such sustained high temperature running on one shoulder. Thus, the rider has to negotiate sharp corners on treads having inherently inferior grip in addition to suffering from poor grip due to low temperature.

SUMMARY OF THE INVENTION

It is an object of the present invention to provide a motorcycle tire having improved performance under such circumstances as described above.

According to the present invention, a motorcycle tire has in its normally inflated condition a camber value of between 0.5 and 0.7 and has a maximum axial width between the edge of the ground contacting tread characterized in that, in axial cross-section, the tread comprises two tread rubber components of different rubber compounds joined by a scarf joint, the scarf joint having a width less than the tread width and having an intertread ply comprising reinforcing cords interposed between the two tread components.

By camber value is meant the ratio C/L between the radial distance C from the center to the edge of the tire tread and the axial distance L between the center and edge of the tread.

BRIEF DESCRIPTION OF THE DRAWINGS

Further, aspects of the invention will become apparent from the following description, by way of example only, of one embodiment in conjunction with the following drawing in which.

DETAILED DESCRIPTION OF THE INVENTION

Figure 1:
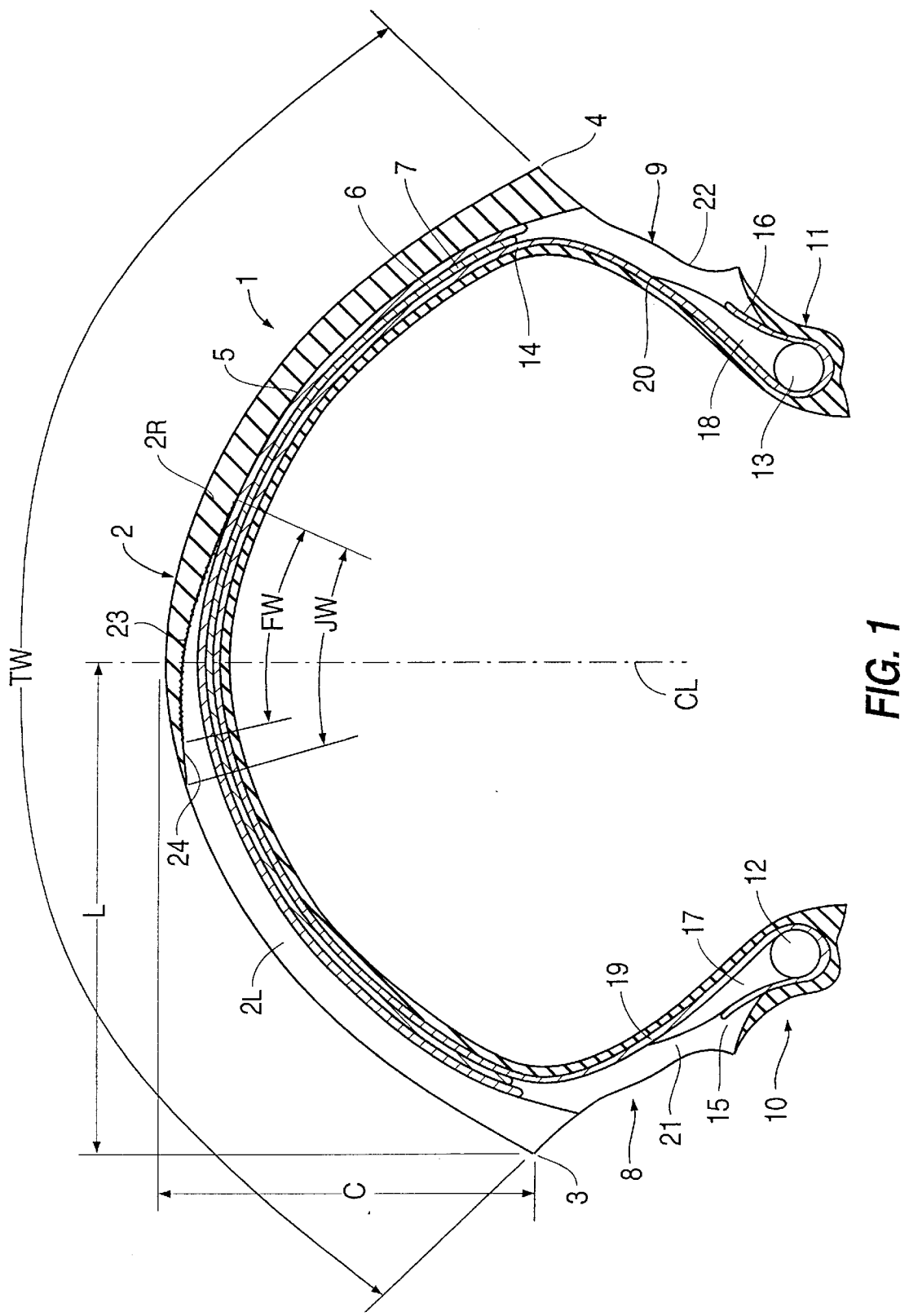
FIG. 1 shows a schematic cross-sectional view of a motorcycle tire of the invention.

The tire of FIG. 1 comprises a pair of sidewall regions 8 and 9 terminating in bead regions 10 and 11. Each bead region is reinforced by an inextensible annular bead core 12 and 13. Extending between each bead region is a carcass reinforced ply 14 which is anchored in each bead region by being turned outwardly around the respective bead core 12,13 to form a ply turn-up 15,16. Between the carcass ply and ply turn-up are hard rubber apex members 17,18 which are anchored to each respective bead core 12,13 and extend taperingly radially outwardly.

The carcass reinforced ply comprises a single ply of nylon tire fabric laid with the cords substantially radially.

The tire further comprises a convex tread region 1 extending between tread edges 3,4 and having a camber C/L of 0.6. The tread region 1 has a reinforcing breaker 5 disposed radially outward of the carcass ply comprising two breaker plies 6 and 7 each of which comprises aramid cord tire fabric. The cords of the breaker plies 6 and 7 are oppositely inclined with respect to each other at an angle of substantially 25° to the tire circumferential direction.

Radially outward of the breaker is a ground contacting tread rubber 2 comprising a left and right tread component 2L and 2R respectively. The two tread components 2L and 2R are joined by a tapering overlap or scarf joint 24 centered substantially on the circumferential centerline CL of the tire. The scarf joint 24 has a width JW of 50 mm which is 22% of the tread width TW measured along the arc of the tread surface. Preferably, the scarf joint 24 has a width in the range of 10 to 40% of the tread width.

The scarf joint 24 also includes a circumferentially extending intertread ply 23 lying on the interface between the two tread components 2L and 2R. The intertread ply 23 comprises rubber coated nylon cords of 2/94 TEX lying mutually parallel at 100 cords per decimetre and disposed at substantially 26° to the tire circumferential direction. The cords of the intertread ply are crossed with respect to the cords of the outermost breaker ply 6.

Preferably, the cords of the intertread fabric lie at between 15° to 40° to the tire circumferential direction and are laid at between 70 and 130 cords per decimetre.

The width FW of the intertread ply 23 is 45 mm and it extends from the radially inner end of the joint to within 5 mm of the radially outer end of the joint on the tread surface. Preferably the width intertread ply is greater than 50% of the joint width.

The rubber compounds of the two tread components are optimized for different characteristics consistent with the configuration of the race circuit on which it is intended to use the tire. Accordingly, for this tire, which is designed specifically for a circuit with long slow left-hand curves and a few sharp right-hand corners, the left-hand tread component 2L is formulated for wear and damage resistance in prolonged high temperature running while the right-hand tread component 2R is formulated for high grip at relative low temperature.

Tires according to the above described embodiment have been fitted to racing motorcycles and shown to give improved performance on difficult race circuits as previously defined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A motorcycle tire having in its normally inflated condition a camber value C/L of between 0.5 and 0.7 and having a maximum axial width between edges of a ground contacting tread wherein in axial cross-section the tread comprises two tread rubber components of different rubber compounds joined by a scarf joint, the scarf joint having a width between 10 and 40% of the width along the arc of the tread surface and having an intertread ply comprising reinforcing cords interposed between the two tread rubber components wherein the cords of the intertread ply are parallel and are inclined at an angle of 15° to 40° with respect to the tire circumferential direction.

2. A tire according to claim 1, wherein the intertread ply has a width of greater than 50% of the width of the scarf joint.

3. A tire according to claim 1, wherein the scarf joint is centred substantially on the circumferential centreline of the tire.

4. A tire according to claim 1, wherein the reinforcing cords of the intertread ply are organic fibre cords.

5. A tire according to claim 4, wherein the cords of the intertread ply are polyamide cords.

6. A tire according to claim 1, wherein the cords are inclined at substantially 26° to the tire circumferential direction.

7. A tire according to claim 1, wherein the intertread ply has cords laid at between 70 and 130 cords per decimetre.

8. A tire according to claim 1, wherein the intertread ply has cords laid at 100 cords per decimetre.

9. A tire according to claim 1, wherein the intertread ply comprises rubber coated cords.

* * * * *